United States Patent [19]

Roelofsma et al.

[11] Patent Number: 4,863,625

[45] Date of Patent: Sep. 5, 1989

[54] TITANIUM-CONTAINING AND COBALT-CONTAINING MANGANESE-ZINC FERRITE CORE AND METHOD OF MANUFACTURING SAME

[75] Inventors: Johannus J. Roelofsma; Theodorus G. W. Stijntjes, both of Eindhoven, Netherlands

[73] Assignee: U.S. Philips Corporation, New York, N.Y.

[21] Appl. No.: 148,184

[22] Filed: Jan. 26, 1988

Related U.S. Application Data

[63] Continuation of Ser. No. 942,949, Dec. 17, 1986, abandoned, which is a continuation of Ser. No. 784,911, Oct. 4, 1985, abandoned.

[30] Foreign Application Priority Data

Oct. 30, 1984 [NL] Netherlands ............... 8403282

[51] Int. Cl.$^4$ ............................................. C04B 35/32
[52] U.S. Cl. .................................. 252/62.59; 252/62.62
[58] Field of Search ........................... 252/62.59, 62.62

[56] References Cited

U.S. PATENT DOCUMENTS

| | | | |
|---|---|---|---|
| 2,640,813 | 6/1953 | Berge | 252/62.59 |
| 3,271,316 | 9/1966 | Inoue et al. | 252/62.62 |
| 3,457,174 | 7/1969 | Deschamps et al. | 252/62.59 |
| 3,567,641 | 3/1971 | Ross et al. | 252/62.62 |
| 3,574,116 | 4/1971 | Sugano et al. | 252/62.59 |
| 3,645,898 | 2/1972 | Klerk et al. | 252/62.62 |

FOREIGN PATENT DOCUMENTS

| | | | |
|---|---|---|---|
| 1771921 | 12/1972 | Fed. Rep. of Germany ... | 252/62.62 |
| 59-63705 | 4/1984 | Japan | 252/62.62 |
| 7217671 | 7/1973 | Netherlands | 252/62.59 |
| 1092009 | 11/1967 | United Kingdom | 252/62.59 |

*Primary Examiner*—John Doll
*Assistant Examiner*—Robert M. Kunemund
*Attorney, Agent, or Firm*—Norman N. Spain

[57] ABSTRACT

A ferromagnetic titanium-containing and cobalt-containing manganese-zinc-ferrite core which shows low power losses at high drive in a wide temperature range, characterized in that its composition essentially corresponds to the molecular formula $$Mn_a^{2+}Zn_b^{2+}Fe_c^{2+}Co_d^{2+}Ti_4^{4+}V_{c_x}Fe_f^{3+}O_4^{2-}$$

With $V_c$ = cation vacancy concentration $$0.65 \leq a \leq 0.80$$
$$0.10 \leq b \leq 0.25$$
$$0.07 \leq c \leq 0.10$$
$$0.005 \leq d \leq 0.007$$
$$0.02 \leq e \leq 0.04$$
$$0.003 \leq x \leq 0.010$$
$$1.92 \leq f \leq 1.98$$
$$a + b + c + d - e + 3x = 1; f + 2e - 2x = 2.$$

3 Claims, 3 Drawing Sheets

TITANIUM-CONTAINING AND COBALT-CONTAINING MANGANESE-ZINC FERRITE CORE AND METHOD OF MANUFACTURING SAME

This is a continuation of application Ser. No. 784,911, filed Oct. 4, 1985, now abandoned, which is a continuation of application Ser. No. 942,949 filed Dec. 17, 1982, now abandoned.

The invention relates to a ferromagnetic titanium-containing and cobalt-containing manganese-zinc ferrite core which shows low losses at power applications in a wide temperature range.

Ferrite cores of the above-mentioned type may be used as annular magnet cores for deflection devices in television receivers and monitors and as cores for transformers and coils in modern supply systems, notably in switched mode power supplies.

In both types of application the power or Watt losses occurring in the ferrite material as a function of the frequency are decisive to a high extent of the applicability thereof. This is the more important because on the one hand there is a tendency to operate deflection devices at ever increasing frequencies and on the other hand to reduce the dimensions of supply systems by increasing the operational frequency.

The total amount of the power losses consists of three contributions:
a. eddy current losses
b. residual losses. The eddy current losses are small with respect to the total amount of the losses, at least in the frequency range up to 500 kHz which is of importance for the abovementioned applications. The residual losses play a role only at very low induction levels and in the present applications which involve a high induction level they may be neglected. The hysteresis losses hence form the most important contribution to the power losses.

Titanium-containing and cobalt-containing manganese zinc ferrite cores are known from GB-A 1,092,009. It is stated in this Application that the addition of (0.3 mol %) $TiO_2$ and (0.3 mol.%) CoO has for its object to provide materials having a reduced loss factor, reduced hysteresis losses and a reduced temperature factor of the magnetic initial permeability. However, these known materials as such are not suitable for use as power materials at high frequencies. For that purpose, their chemical composition and their microstructure must be optimized.

It is the object of the present invention to provide titanium-containing and cobalt-containing Mn-Zn-ferrite cores which show low losses at power application in a wide temperature range.

Ferrite cores according to the invention are characterized by a composition which essentially satisfies the molecular formula:

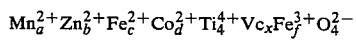

$$Mn_a^{2+}Zn_b^{2+}Fe_c^{2+}Co_d^{2+}Ti_4^{4+}V_{c_x}Fe_f^{3+}O_4^{2-}$$

wherein $V_c$=cation vacancy concentration $$0.65 \leq a \leq 0.80$$
$$0.10 \leq b \leq 0.25$$
$$0.07 \leq c \leq 0.10$$
$$0.005 \leq d \leq 0.007$$
$$0.02 \leq e \leq 0.04$$
$$0.003 \leq x \leq 0.010$$
$$1.92 \leq f \leq 1.98$$
$$a + b + c + d - e + 3x = 1; f + 2e - 2x = 2.$$

The cation vacancy concentration preferably is such that $0.004 \leq x \leq 0.008$. The invention is based on the recognition of the fact that for minimum power losses the presence of cation vacancies in a very particular concentration is necessary. When the cation vacancy concentration $V_c$ is lower than 0.003, extra losses are introduced by undesired inclusions in the crystal lattice of the ferrite. If $V_c$ is higher than 0.010, lattice stresses occur by beginning segregation of $\alpha-Fe_2O_3$ crystals.

This was not taken into account in the so far known titanium-containing and cobalt-containing manganese-zinc ferrites.

The manganese content in the present titanium-containing and cobalt-containing manganese-zinc ferrite varies from 0.65 to 0.80. The reason for this is that at lower contents too much saturation is lost and at too high contents the range with favourable properties shifts to too high temperatures for most applications.

The zinc content b varies from 0.10 to 0.25. The reason for this is that below 0.10 the range with good properties lies at too high temperatures for most applications. Above 0.25 the value of the saturation magnetization falls too much in the desired operating range.

The content c of bivalent iron varies from 0.07 to 0.10. The reason for this is that herewith a good anisotropy and magnetostriction compensation in the desired temperature range of most applications is reached.

The cobalt content d varies from 0.005 to 0.007. The reason for this is that as a result of the extra anisotropy compensation which this small but specific Co addition involves, the properties are optimized in a wider temperature range.

The titanium content e varies from 0.02 to 0.04. The reason for this is optimization of the anisotropy behaviour. Moreover, as a result of $Ti^{4+}$ the resistivity is increased as a result of which the eddy currents remain negligible up to high frequencies so that less than 0.2 is undesired. More than 0.04 gives too large a fall of the value of the saturation magnetization.

In the preparation of Mn-Zn ferrites on an industrial scale, raw materials are generally used which comprise a small content of CaO and $SiO_2$. Because technical raw materials often show variations in the CaO and $SiO_2$ contents, it is recommendable to control in the composition the content of CaO and $SiO_2$ towards a given level because the sintering behaviour is influenced by said components. In the cobalt-containing and titanium-containing Mn-Zn-ferrite cores according to the invention it has been found that good properties can be realized if the content of CaO is between 0.02 and 0.07% by weight and the content of $SiO_2$ is between 0.01 and 0.025% by weight.

In order to be able to realize the required cation vacancy concentration the sintering process in the preparation of the ferrite material should be accurately controlled. The invention therefore also relates to a method of manufacturing a magnet core constructed from a titanium-containing and cobalt-containing Mn-Zn-ferrite. This method is characterized in that a usually prefixed mixture of the ferrite-forming starting substances is sintered at a temperature between 1200° C. and 1300° C. in an oxygen-containing atmosphere at a partial oxygen pressure according to the formula $P_{o2} = -C_1/T + C_2$, wherein the partial oxygen pressure $P_{o2}$ has a value of $3.5 \times 10^{-2}$ to $6.5 \times 10^{-2}$ bars at 1200° C. and of $16 \times 10^{-2}$ to $32 \times 10^{-2}$ bars at 1300° C., respectively, and in which a continuous control of the temperature-oxygen combination according to this formula is used from at least 850° C. upon heating and to at least 900° C. upon cooling, it being ensured that the partial oxygen pressure $P_{o2}$ at 950° C. is between $12 \times 10^{-5}$ bars and $21 \times 10^{-5}$ bars. (The temperature T in the formula is in K.; $C_1$ and $C_2$ in the formula are constants).

From approximately 900° C. in the cooling portion of the sintering process the partial oxygen pressure is kept constant, preferably at a level between $2 \times 10^{-5}$ and $6 \times 10^{-5}$ bars (this corresponds to an $O_2$-content between 0.002% and 0.006% at 1 atmosphere).

An embodiment of the invention will be described in greater detail with reference to the following example explained with reference to FIGS. 1-5.

EXAMPLE

The following (a small amount of $SiO_2$ and CaO containing) raw materials were used for the composition of a ferrite material according to the invention:
$Fe_2O_3$
$Mn_2O_3$
ZnO
$Co_2O_3$
$TiO_2$ The weighed-in mass was ground wet in a ball mill for 6 hours. After drying the mixture was prefired in a chamber kiln at a temperature of 840° C. in air, after which it was ground wet in a ball mill for 12 hours. The CaO and $SiO_2$ contents were adjusted to be 0.03 and 0.02% by weight, respectively, in the final composition.

This composition was controlled by means of the X-ray fluorescence method for the main components:
$Fe_2O_3 = 51.41$ mol.%
MnO $= 36.78$ mol.%
ZnO $= 9.90$ mol.%
CoO $= 0.30$ mol.%
$TiO_2 = 1.61$ mol.%

Figure 1:
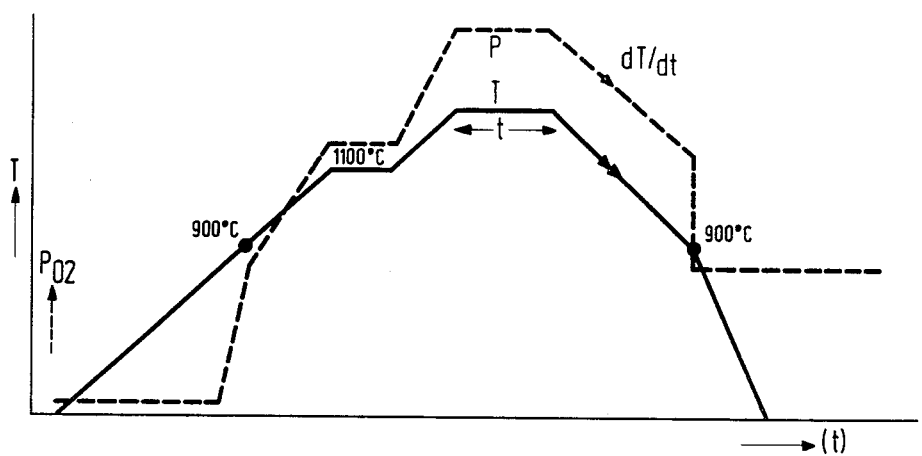
FIG. 1 shows diagrammatically a heating-sintering-cooling programme for preparing titanium-containing and cobalt-containing Mn-Zn-ferrites.

Rings were compressed from this composition and were sintered according to a heating-sintering-cooling programme as described hereinafter and as shown diagrammatically in FIG. 1.

Heating in $N_2$ to approximately 850° C. at a heating rate of 175° C./h. From 900° C. during heating up to approximately 900° C. during cooling the oxygen atmosphere is controlled continuously according to the relation log $P_{o2} = -C_1/T + C_2$, where $P_{o2}$ at 900° C. is $9 \times 10^{-5}$ bars and at 1250° C. is $12 \times 10^{-2}$ bars. The limits of $C_1$ and $C_2$ follow from the data that in order to obtain a ferrite having a cation vacancy concentration according to the invention the oxygen partial pressure at 1250° C. must be between $8 \times 10^{-2}$ bars ($=8\%$ $O_2$ at 1 atmosphere) and $14 \times 10^{-2}$ bars ($=14\%$ $O_2$ at 1 atm) and that at 950° C. the partial pressure must be between $12 \times 10^{-5}$ bars ($=0.012\%$ $O_2$ at 1 atm) and $21 \times 10^{-5}$ bars ($=0.021\%$ $O_2$ at 1 atm). At 1100° C. in the heating part the temperature is kept constant for 1 hour after which heating to 1250° C. is carried out at a rate of 175° C./h. This peak temperature is maintained for 1 hour, after which cooling at a rate of 50° C./h is carried out down to 900° C.

From 900° C. an $O_2$-residual level is adjusted of $5 \times 10^{-5}$ bars down to room temperature.

Figure 2:
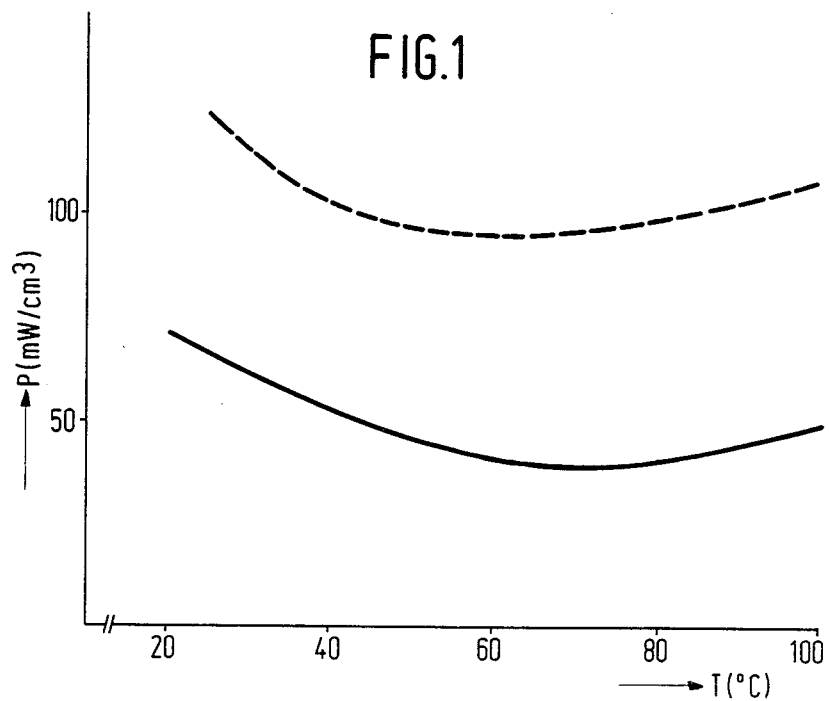
FIG. 2 shows a graph which represents the power losses P (in mW/cm³) of two titanium-containing and cobalt-containing Mn-Zn-ferrite cores as a function of the temperature T (in °C.).
Figure 3:
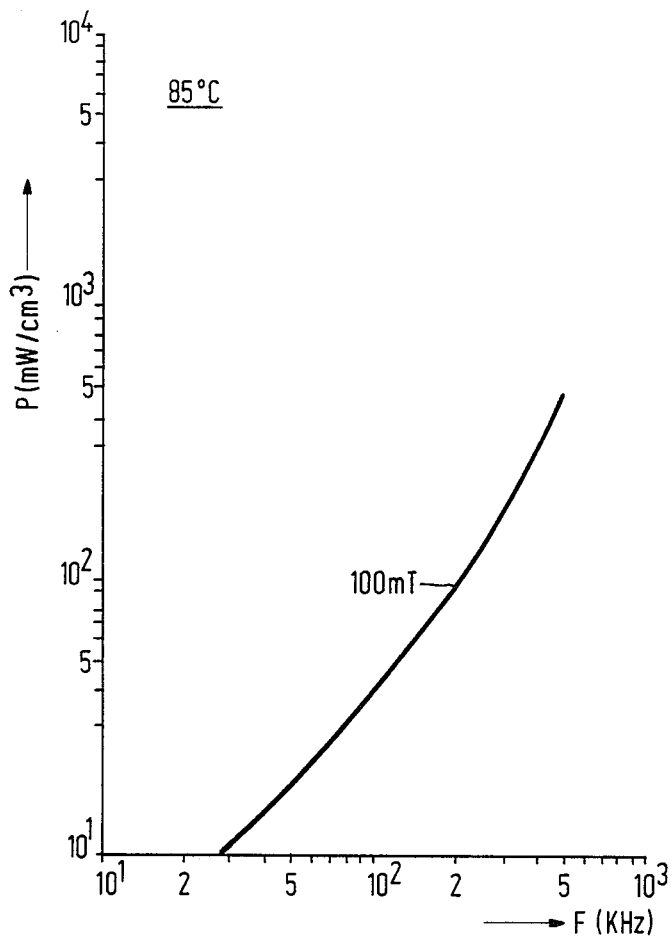
FIG. 3 shows a graph which represents the power losses P (in mW/cm³) of a titanium-containing and cobalt-containing Mn-Zn-ferrite core according to the invention as a function of the frequency F (in kHz).
Figure 4:
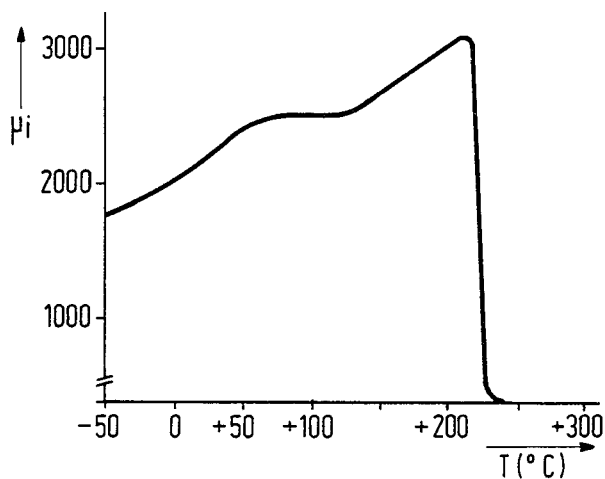
FIG. 4 shows a graph which represents the initial permeability $\mu_i$ of a titanium-containing and cobalt-containing Mn-Zn-ferrite core according to the invention as a function of the temperature T (in °C.).
Figure 5:
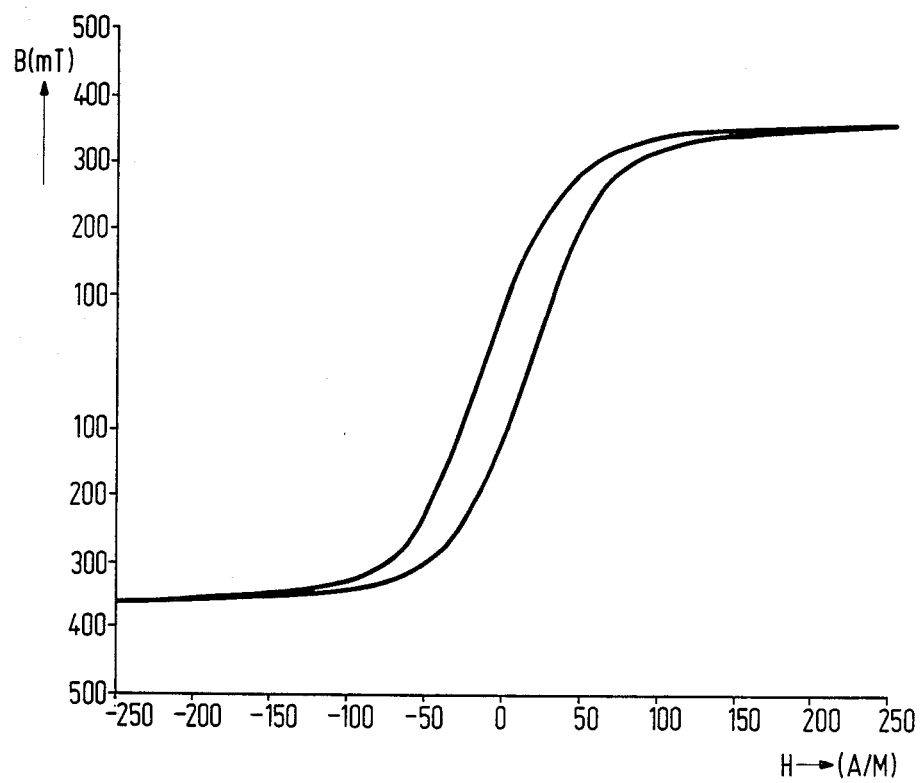
FIG. 5 shows a graph which represents the induction B (in mT) of a titanium-containing and cobalt-containing Mn-Zn-ferrite core according to the invention as a function of the field strength H (in A/m).

The following properties were measured in the sintered rings:
P-T at 100 kHz, mT (FIG. 2 the solid curve. The broken-line curve belongs to a titanium-containing and cobalt-containing Mn-Zn-ferrite ring which did not have the cation vacancy concentration prescribed by the invention.)
P-F at 85° C. at an induction of 100 mT (FIG. 3)
$\mu_i$-T at an induction 0.1 mT (FIG. 4)
B-H curve at 100 kHz and 100° C. (FIG. 5).

Of the ferrite of the rings the ferro-content was measured, 2.64% by weight of FeO being analysed. From this analysis the correct ferrite formula has been computed according to the method described hereinafter including the cation vacancy concentration present.

From calculation of an X-ray fluorescence analysis of the produced composition it follows:

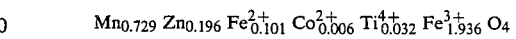

$$\text{Stoechiometric FeO-content: } \frac{0.101 \times (55.847 + 16)}{232.51} =$$

3.12 wt. %

Analysis is carried out via the wet chemical route: 2.64% by weight of FeO. The difference is 0.48% by weight. This corresponds to:

$$\frac{0.48}{100} \times \frac{232.51}{71.847} = 0.0155 \text{ mol FeO/mol ferrite.}$$

Formation vacancy ferrite:

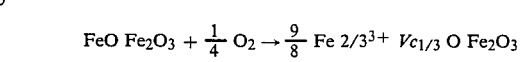

→number of mol. vac. ferrite/mol ferrite $= 9/8 \times 0.0155 = 0.0174$ mol, which means:

$$[Vc] = \frac{1}{3} \times 0.0174 = 0.0058$$
$$\text{rounded off} = 0.006$$

However, the fact should also be taken into account that $O_2$ is added:

$$\frac{1}{4} \times 0.0155 \times 2 = 0.0077 \text{ mol O}$$

rounded off $= 0.008$ mol O → in total 4.008 mol.O 2.64 wt. % FeO analysed, which means $$\left. \begin{array}{l} \frac{2.64}{100} \times \frac{232.51}{71.847} = 0.085 \text{ mol FeO} \\ \text{Fe}^{2+} + \text{Fe}^{3+} = 2.037 \end{array} \right\} \text{Fe}^{3+} = 1.952$$

When the indices of all positive ions are added, this results in $\Sigma\oplus_i = 3.006$. In order to standardize at $\Sigma\oplus = 3$, there should be multiplied by a factor $$\frac{3.000}{3.006} = 0.998.$$

This gives as a composition of the manufactured ferrite

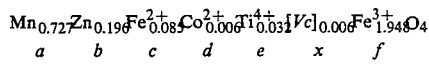

What is claimed is:

1. A ferromagnetic cation-vacancy containing, titanium-containing and cobalt-containing manganese-zinc ferrite core which shows low losses at power application in a wide temperature range, characterized in that its composition essentially satisfies the molecular formula $$\text{Mn}^{2+}_a \text{Zn}^{2+}_b \text{Fe}^{2+}_c \text{Co}^{2+}_d \text{Ti}^{4+}_e V_{c_x} \text{Fe}^{3+}_f \text{O}^{2-}_4$$

wherein $V_c$ = cation vacancy concentration $0.65 \leq a \leq 0.80$
$0.10 \leq b \leq 0.25$
$0.07 \leq c \leq 0.10$
$0.005 \leq d \leq 0.007$
$0.02 \leq e \leq 0.04$
$0.003 \leq x \leq 0.010$
$1.92 \leq f \leq 1.98$
$a + b + c + d - e + 3x = 1; f + 2e - 2x = 2.$ 2. A ferrite core as claimed in claim 1, characterized in that $0.004 \leq x \leq 0.008$.

3. A ferromagnetic titanium-containing, cobalt-containing and cation-vacancy containing manganese-zinc ferrite core which shows low losses at power applications about 500 KHz in a wide temperature range, characterized in that it has a composition which essentially satisfies the molecular formula $$\text{Mn}^{2+}_a \text{Zn}^{2+}_b \text{Fe}^{2+}_c \text{Co}^{2+}_d \text{Ti}^{4+}_e V_{c_x} \text{Fe}^{3+}_f \text{O}^{2-}_4$$

wherein $V_c$ = cation vacancy concentration $0.65 \leq a \leq 0.80$
$0.10 \leq b \leq 0.25$
$0.07 \leq c \leq 0.10$
$0.005 \leq d \leq 0.007$
$0.02 \leq e \leq 0.04$
$0.003 \leq x \leq 0.010$
$1.92 \leq f \leq 1.98$ $a + b + c + d - e + 3x = 1; f + 2e - 2x = 2,$ and has a content of p percent by weight of CaO and q percent by weight of SiO$_2$, wherein
$0.02 \leq p \leq 0.07$
$0.01 \leq q \leq 0.025$.

* * * * *